United States Patent [19]
Knauf

[11] 3,920,215
[45] Nov. 18, 1975

[54] VALVE

[76] Inventor: Dieter W. Knauf, 16844 Edgar St., Pacific Palisades, Calif. 90272

[22] Filed: May 13, 1974

[21] Appl. No.: 469,369

Related U.S. Application Data

[63] Continuation-in-part of Ser. No. 331,002, Feb. 9, 1973, abandoned.

[52] U.S. Cl. .................................. 251/7; 251/251
[51] Int. Cl.² .................................. F16K 7/06
[58] Field of Search ............. 251/4, 5, 6, 7, 8, 251, 251/397, 340

[56] References Cited
UNITED STATES PATENTS

| | | | |
|---|---|---|---|
| 278,008 | 5/1883 | Haley | 251/251 |
| 3,118,646 | 1/1964 | Markey | 251/5 |
| 3,436,054 | 4/1969 | Cole et al. | 251/8 |
| 3,741,517 | 6/1973 | Pogonowski | 251/5 |
| 3,791,617 | 2/1974 | Press | 251/8 |

FOREIGN PATENTS OR APPLICATIONS

| | | | |
|---|---|---|---|
| 734,885 | 8/1955 | United Kingdom | 251/7 |
| 960,889 | 4/1950 | France | 251/8 |

Primary Examiner—Martin P. Schwadron
Assistant Examiner—George L. Walton
Attorney, Agent, or Firm—Lindenberg, Freilich, Wasserman, Rosen & Fernandez

[57] ABSTRACT

A compact and simple valve which operates effectively using low-cost injection molded parts, including a sleeve of resilient material, a housing surrounding the sleeve and having a pair of guides, a pair of closing members slideably mounted in the guide, and a cam rotatably mounted about an axis coincident with the axis of the tube for moving the closing members together to pinch the tube closed.

9 Claims, 13 Drawing Figures

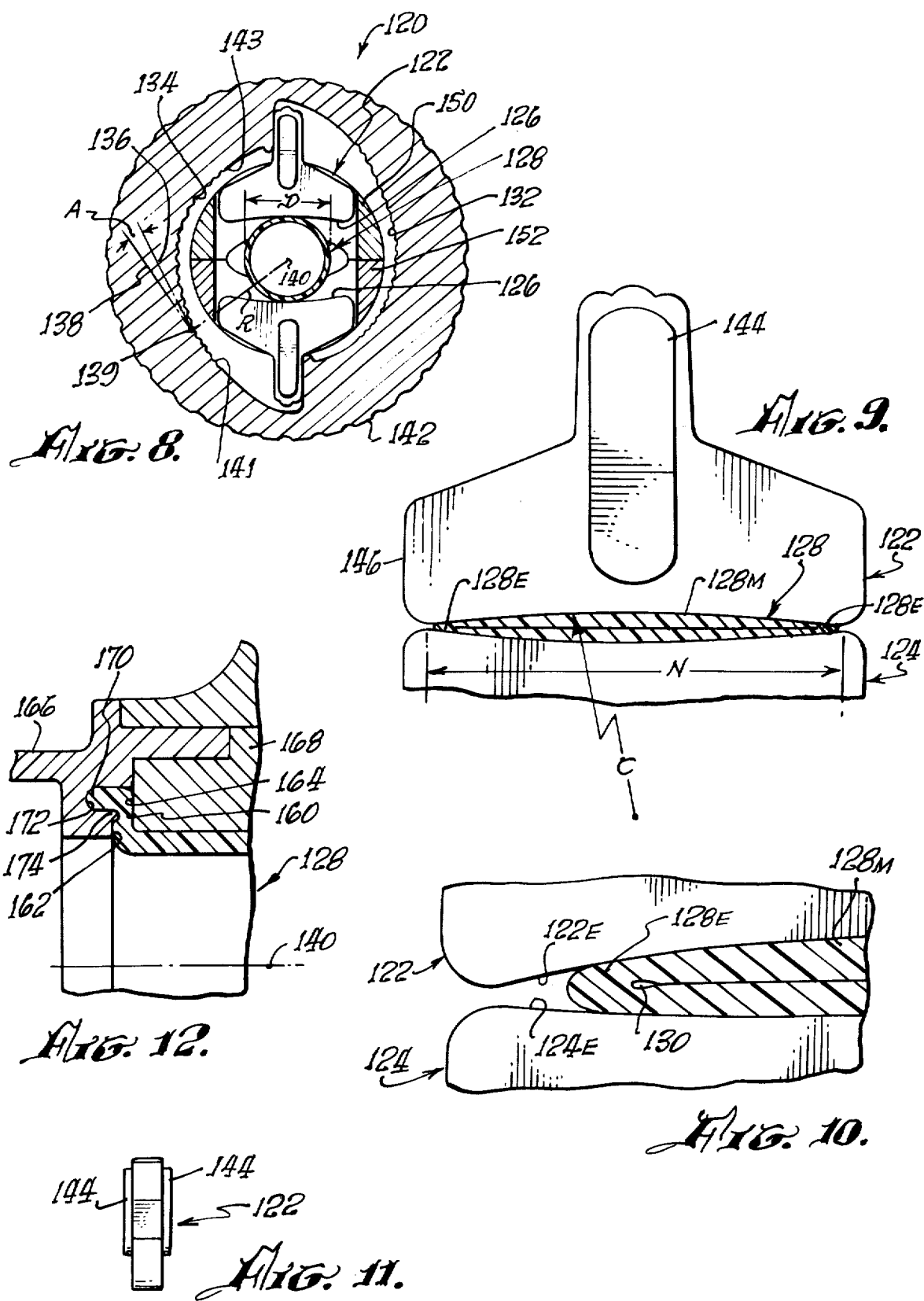

VALVE

CROSS-REFERENCE TO RELATED APPLICATION

This is a continuation-in-part of now abandoned U.S. patent application Ser. No. 331,002 filed Feb. 9, 1973 entitled VALVE by Dieter W. Knauf.

BACKGROUND OF THE INVENTION

This invention relates to valves.

Plastic pipes and couplings have increasingly replaced metal parts in irrigation systems and the like, at considerable savings in cost and weight and improved corrosion resistance. However, there has not been a corresponding acceptance of plastic valves because they have tended to leak and have had a high frequency of breakdown and jamming. A valve utilizing plastic parts in a design that minimized leakage, breakdown, and jamming, would enable the construction of irrigation systems of lower cost and weight and greater corrosion resistance. If the valve were also more compact, further savings could be made in material, space and weight.

SUMMARY OF THE INVENTION

In accordance with one embodiment of the present invention, a valve is provided which is of simple and compact design and which can be made to operate reliably using easily formed plastic parts. The valve includes a tube of resilient material, a pair of compressing members on opposite sides of the tube, and a cam for moving the compressing members together to pinch the tube closed so that fluid cannot flow therethrough. The cam is mounted to rotate about the axis of the tube and has camming surfaces extending in a spiral and engaged with the compressing members. The resilient tube has large flanges at either end thereof, and the valve housing presses against the flanges to keep the tube in a slightly compressed state when it is undeformed, to thereby minimize stretching of the tube when it is pinched closed. The compressing members are provided with stress-relieving portions that partially compress the tube on either side of the location which is pinched completely closed, to minimize stress concentrations on the tube.

The novel features of the invention are set forth with particularity in the appended claims. The invention will best be understood from the following description when read in conjunction with the accompanying drawings.

BRIEF DESCRIPTION OF THE DRAWINGS

FIG. 6 is a partial sectional view of a valve constructed in accordance with another embodiment of the invention; and FIG. 7 is a view taken on the line 7—7 of FIG. 6.

FIG. 8 is a sectional front view of a valve constructed in accordance with a further embodiment of the invention;

FIG. 9 is an enlarged front view of the closing members of the valve of FIG. 8 with the valve closed;

FIG. 10 is a greatly enlarged view of area 10—10 of FIG. 9, but in a slightly open condition.

FIG. 11 is a side view of a closing member of the valve of FIG. 8; and

FIG. 12 is a partial sectional side view of the valve of FIG. 8.

DESCRIPTION OF THE PREFERRED EMBODIMENTS

Figure 1:
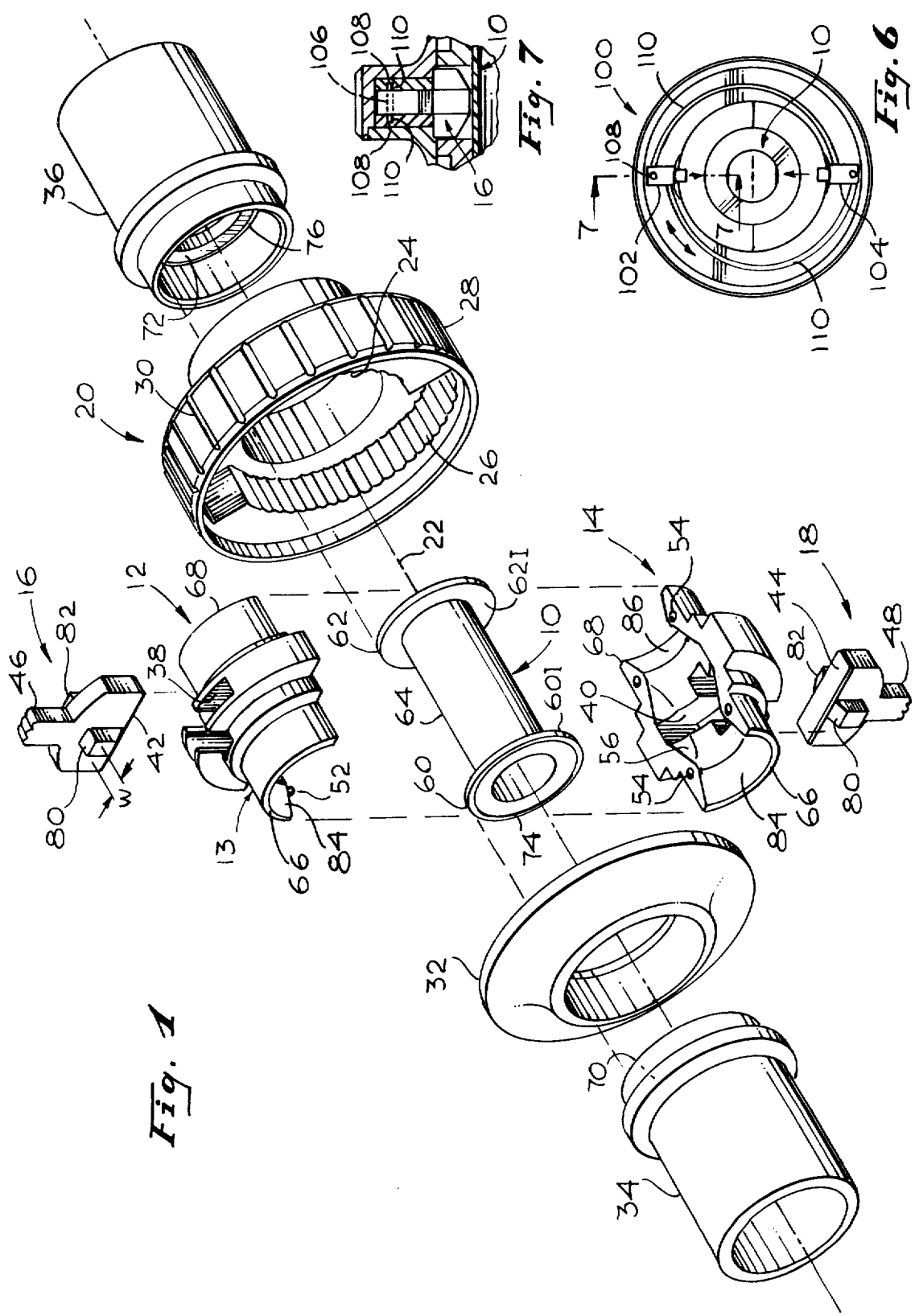
FIG. 1 is a partially exploded perspective view of a valve constructed in accordance with one embodiment of the present invention.

FIG. 1 illustrates a valve which includes a sleeve or tube 10 of flexible and resilient material such as polyurethane or polyethylene, a pair of inner housing parts 12, 14 that surround the sleeve, and a pair of closing or compressing members 16, 18 that slide through the housing parts 12, 14 and against opposite sides of the sleeve 10 to pinch the sleeve closed. A cam 20 is rotatably mounted about includes a cover 32 that covers an end of the cam 20 to enclose the camming surface portions, and a pair of tubular end members or housing parts 34, 36 that attach to the inner housing parts 12, 14 to keep the valve parts assembled. The tubes 34, 36 are constructed to facilitate their connection to the ends of pipes to connect the valve in a pipe line. All of the parts of the valve can be constructed of plastic by injection molding processes, and all parts except the sleeve 10 can be constructed of very low cost rigid plastic such as a polyvinyl chloride (PVC) type.

The inner housing parts 12, 14 have slots 38, 40 extending radially (towards the tube axis 22) through which the compressing members 16, 18 can slide. Each compressing member has a nip portion 42, 44 or surface, that lies closest to the tube axis 22 and which extends transverse to the axis of the tube. When the compressing members are forced together, their nip portions 42, 44 engage opposite sides of the tube 10 to force the tube sides together so as to reduce the size of the opening through the tube and eventually close it off completely. Each compressing member 16, 18 also has a cam follower portion 46, 48, that extends radially outwardly and into engagement with one of the camming surfaces 24, 26 of the cam. The camming surfaces 24, 26 of the valve of FIGS. 1–5 can press the compressing members 16, 18 inwardly to pinch off the tube 10, and can release the compressing members so they are free to be moved outwardly by elastic forces of the deformed tube 10 and by the pressure of liquid within the tube.

Figure 3:
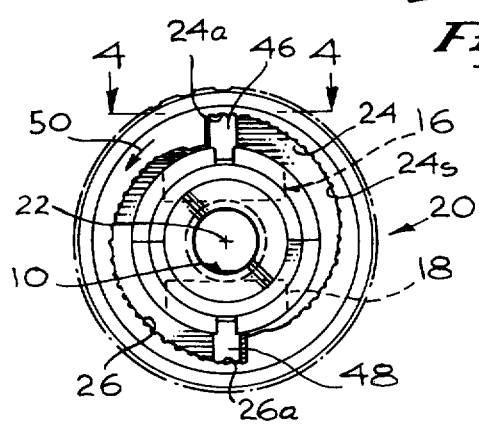
FIG. 3 is a view taken on the line 3—3 of FIG. 2.
Figure 3A:
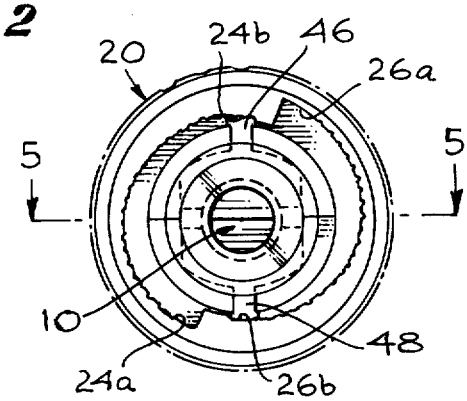
FIG. 3A is a view similar to FIG. 3, but with the valve in a closed state.
Figure 4:
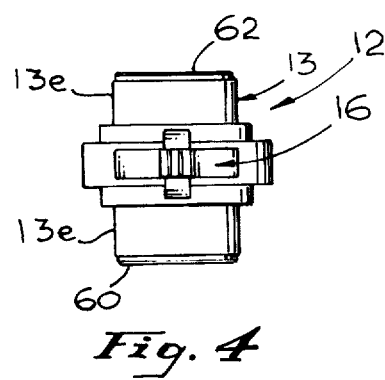
FIG. 4 is a view taken on the line 4—4 of FIG. 3.
Figure 5:
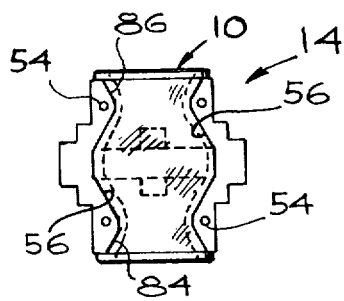
FIG. 5 is a view taken on the line 5—5 of FIG. 3A.

FIGS. 3 and 3A illustrate the manner in which the cam 20 moves the cam followers 46, 48 of the compressing members 16, 18 to make them squeeze the tube 10. The camming surfaces 24, 26 extend in substantially a spiral about the axis 22 of the tube so that for example, locations along the camming surface 24 that are angularly spaced progressively from the end 24a are generally progressively closer to the axis 22. As a result, rotation of the cam 20 in the direction of arrow 50 causes the cam followers 46, 48 to be moved progressively inwardly and therefore to squeeze the tube 10 progressively more closed. When the cam followers are engaged with the outer camming surface ends 24a, 26a as illustrated in FIG. 3, the valve is completely opened, and when the end followers engage the opposite ends 24b, 26b as illustrated in FIG. 3A the tube 10 is pinched completely closed. An operator can turn the cam 20 to a wide range of intermediate positions to choose any partial constriction of water flow. The cam is securely retained in any of the partially closed positions because it is formed with numerous steps instead of as a smooth curve. Each of the steps such as 24s is of a scallop shape, and the end of each cam follower such as 46 is provided with three corresponding ridges that can fit into three scallops of the camming surface. When the operator turns the cam, he feels and hears many clicks. This provides assurance to the operator that the valve will hold the partial closure position, and also enables him to make small step adjustments as by turning the cam by an angle corresponding to a predetermined number of clicks. Of course, the camming surface can be made without steps between the on and off positions, particularly where the valve is normally used only in the completely on or off positions.

Figure 2:
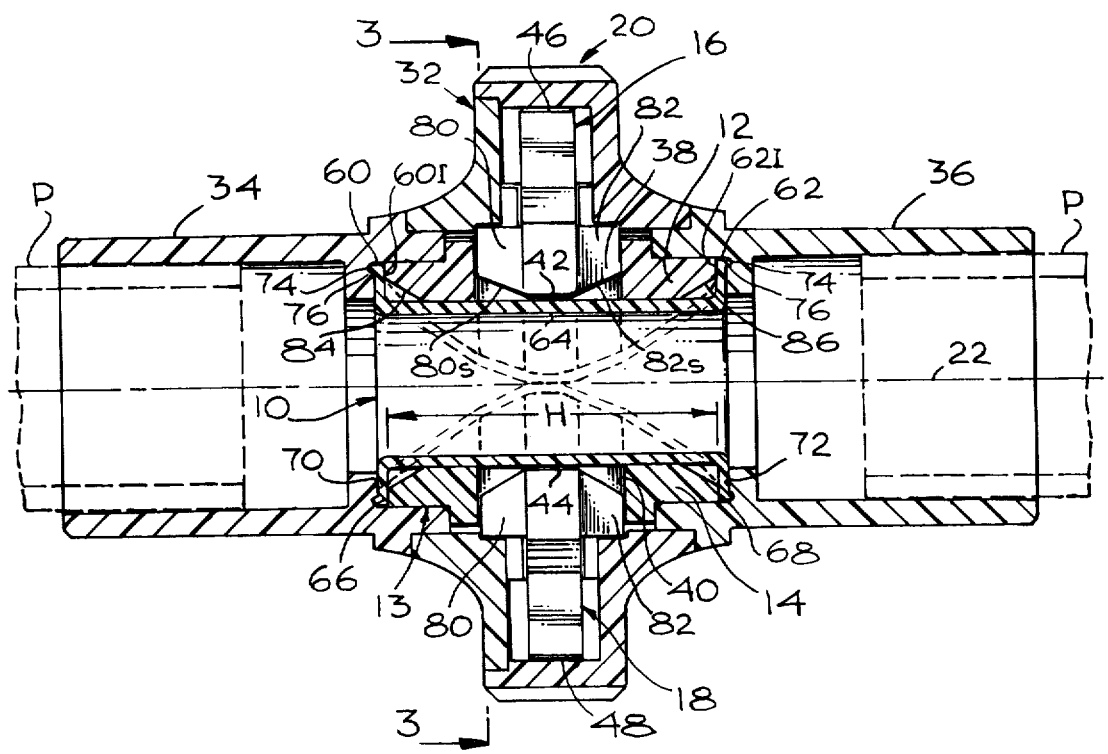
FIG. 2 is a sectional side view of the valve of FIG. 1 in an open state.

The two inner housing parts 12, 14 are provided with interfitting pins and pinholes 52, 54 (FIG. 1) so they are closely aligned with one another when mounted to surround the elastic tube 10. Each of the parts 12, 14 has an enlarged recess portion for accommodating the tube when it is fully flattened. Thus, the part 14 shown in FIG. 5 has enlarged recessed portions 56 on either side thereof which receive the extra width of the tube 10 when it is fully flattened. The inner housing parts 12, 14 not only guide the compressing members 16, 18 in radial sliding, but also prevent the compressing members from rotating about the tube axis 22 when the cam 20 is turned. As illustrated in FIG. 2, the inner housing formed by the parts 12, 14 closely receives the tubular end members 34, 36 and these end members form the inlet and outlet of the valve and are joined to a pipe line P through which water can flow. Generally, solvent cement, ultrasonic welding, or other fastening means is provided to fix the tubular members 34, 36 to the pipe line P and to fix the inner housing formed by the parts 12, 14 securely to the members 34, 36, so that none of these parts can move and therefore only the cam 20 can rotate.

The tube 10 is formed with a pair of flanges 60, 62 at its opposite ends which are integral with a tubular center portion 64. The tube is mounted as shown in FIG. 2, with the flanges 60, 62 clamped between shaped end surfaces 66, 68 formed on the inner housing parts 12, 14 and shaped end surfaces 70, 72 formed on the tubular members 34, 36. The flanges 60, 62 are compressed between these end surfaces of the inner housing parts and the tubular members, so that the flanges serve as seals that prevent the leakage of water. Each of the flanges has a ridge 74 that extends from the face thereof and which is received in a corresponding groove 76 of a tubular member 34, or 36. The ridges 74 help to prevent radially inward movement of the flanges when the sleeve 10 is being pinched closed which urges its ends to be drawn towards one another.

The valve is designed to minimize stressing of the tube 10 when it is pinched closed, to thereby maximize the service life of the tube. Local stresses at the center of the tube where it is pinched closed are minimized by providing stress-relieving portions 80, 82 on each of the compressing members 16, 18. The stress-relieving portions 80, 82 extend from axially opposite sides of the nip portion 42, 44 of the corresponding compressing member. The surfaces 80s, 82s of the stress-relieving portions that face the tube are angled from parallelism with the axis 22 of the tube so that regions of the relieving portions progressively further from the nip portions 42, 44 are at progressively greater distances from the axis 22 of the tube. These stress-relieving surfaces 80s, 82s prevent sharp bending of the tube that would otherwise occur at the nip portions 42, 44 when the nip portions squeeze the tube fully closed. The stress-relieving portions 80, 82 have a width w which is less than the width of the completely flattened tube, so that they relieve stress primarily near the axis of the tube where the elastic material is most highly stretched. The stress-relieving portions of the closing members allow even a relatively short length tube 10 to provide a long lifetime of service.

Stressing of the tube 10 is further minimized by mounting it so that it is initially in slight compression when in its fully opened condition. This is accomplished by constructing the inner housing portion which is formed by the parts 12, 14, so that the length H between the housing surfaces 66, 68 that engage the inner flange surfaces 60I, 62I, is slightly smaller than the distance between the flanges when the sleeve 10 is undeformed. For example, in a valve dimensioned as illustrated in the figures and with a housing distance H of about 1.20 inches, the distance between the flanges of the undeformed sleeve may be about sixty-thousandths inch greater than the distance H (i.e., about 1.26 inch) to provide slight sleeve compression. Concentrated stresses near the flanges is minimized by providing cut-away areas 84, 86 at the radially inner regions of the flange-facing surfaces 66, 68, to leave a large gap around the tubular center portion 64 of the sleeve 10 where it intersects the flanges 60, 62. This relief, at least at the same sides of the tube that are contacted by the compressing members 16, 18 permits the flanges to bend towards each other so as to further minimize stretching of the tube when it is being pinched closed.

The valve can be assembled by bringing the two inner housing parts 12, 14 together around the tube 10 to form an inner housing 13, inserting the compressing members 16, 18 into the slots of the housing parts, and installing the cam 20 around the inner housing and compressing members. The cover plate 32 is then installed on the cam face and the tubular end members 34, 36 that form an inlet and outlet are inserted through holes in the cam 20 and cover plate 32 and over the ends of the inner housing portion 13. The cylindrical ends 13e of the inner housing 13 are of slightly greater diameter than the flanges 60, 62 of the resilient tube, so that the tubular end members 34, 36 can pass around the flanges and closely engage the inner housing. An operator can turn the cam 20 in one direction to pinch the tube closed, and can turn the cam in the opposite direction to allow the tube to open. The resilience of the tube 10 and the fact that it is stretched when pinched closed results in it automatically tending to open up and move out the compressing members 16, 18 when the cam does not hold the compressing members together. The pressure of water in the tube 10 also helps to expand it and therefore automatically open the valve when the cam releases the compressing members to move out.

FIGS. 6 and 7 illustrate a valve constructed in accordance with another embodiment of the invention, wherein a cam 100 is provided which forceably pulls out a pair of cam followers 102, 104 when the cam is turned to open the valve. Each cam follower includes a pin 106 that forms axially-extending cam follower portions 108 that are received in grooves 110 on the cam 100. Each groove 110 includes a wall radially inside the cam follower and a wall radially outside of it, so that the walls of the groove can force the corresponding compression member such as member 16 away from the resilient sleeve 10 as well as against it. The ability of the cam to withdraw the compression members from the sleeve helps to prevent jamming of the valve in a closed position and helps to assure full opening of the valve particularly in the case of low pressure pipe line systems such as drainage types.

FIGS. 8-12 illustrate a valve 120 constructed in accordance with still another embodiment of the invention, which facilitates complete closure of the valve even at high water pressures. A major feature of this valve is that the closing or compressing members 122, 124 have nip portions 126 that are concavely curved along their length, instead of being straight. That is, each nip portion 126 extends transverse to the axis 140 of the resilient sleeve 128, and each nip portion is concavely curved along its length and therefore the closing members are closer together at the opposite ends of their nips than at the middle of their nips. It has been found that with a straight nip such as the nip 44 on the valve of FIG. 1, a complete closure of the valve is difficult. This is because small gaps tend to remain in the tube at the opposite ends of the squeeze line along which the resilient sleeve is squeezed closed. These gaps can be eliminated by applying a large squeezing force, but this means that considerable force is needed to completely close the valve and that the life of the resilient sleeve is greatly diminished. The concavely curved nips 126 of the closing members 122, 124 enable complete closure of the resilient sleeve, or tube, 128 with a minimum of squeezing forced and with a minimal stressing of the sleeve. FIG. 9 illustrates the configuration of the closing members and sleeve 128 when the sleeve is squeezed to a completely closed condition.

FIG. 10 illustrates the valve just prior to closure. The middle portion 128M of the sleeve can be easily squeezed closed, but gaps 130 tend to remain near the ends 128E of the sleeve, or in other words, at sleeve portions near the ends of the squeeze line. Squeezing forces applied near these ends of the sleeve tend to cause the material at the ends 128E to be extruded or elongated, with the gap 130 remaining. However, the curved end portion 122E, 124E of the closing members apply a restraining force against extruding of the elastic sleeve, and therefore prevent indefinite elongation of the end and prevent continuance of the gap 130. By thus restraining the ends of the pinched sleeve from moving outwardly, the concave closing members are able to apply pressure to the sleeve ends that results in closing the gap 130 with only moderate force. As a result, complete closure of the sleeve 128 can be achieved at even high water pressures, with only moderate closing forces applied to the closing members and with only moderate pressure on the sleeve, so that the sleeve has a long life. In one valve having a sleeve 128 of an outer diameter D of 0.60 inch and a wall thickness of 1/16th inch, good closure was achieved by the use of closing members which were concave along a nip portion N of approximately 0.90 inch, which is approximately the width of the tube when it is squeezed nearly closed. The nips of the blocks were curved at a radius C of approximately 6.25 inches, which is about ten times the diameter of the sleeve 128. If a tube 128 with thicker walls is utilized, then a smaller radius of curvature of the closing members must be employed. When the closing members 122, 124 were close enough to completely close the tube, a small gap of about 0.005 inch remained between the closing members at their ends.

In order to minimize the force required to close the valve of FIGS. 8-12, the camming surfaces 132, 134 are formed at a variable spiral angle. The spiral or camming angle is indicated at A, and is the angle between an imaginary line 136 tangent to the camming surface (tangent to the average local camming surface where it has small scallops) and an imaginary line 138 which extends perpendicular to a radial line R. This angle A is initially approximately 7° at the beginning of valve closing at 141, where the radial distance from the sleeve axis 140 to the camming surface is large, but decreases to approximately 1° as full closure of the valve approaches at 143, where the radial distance to the camming surface is small. The reason for providing a decrease in the camming angle is to compensate for the fact that the force which must be applied to the closing members increases as the tube approaches complete closure. By gradually decreasing the camming angle, only a moderate turning force is required to achieve full closure of the valve.

It may be noted that each of the closing members 122, 124 has a pair of long narrow guide bosses 144 formed thereon. These guide bosses 144 serve to guide the closing members in radial movement, instead of utilizing the sides 146 of the closing members. The long narrow guide bosses 144 minimize the possibility of binding of the closing members in the guide slots of the inner housing parts 150, 152 which correspond to the parts 12, 14 in the valve of FIG. 1.

As mentioned in connection with the valve of FIGS. 1-5, the resilient tube or sleeve must be securely anchored at its ends to withstand the pulling forces resulting when the sleeve is pinched closed. FIG. 12 illustrates the manner in which each end of the sleeve 128 is mounted, the sleeve having a flange 160 clamped between end surfaces 162, 164 on a pair of parts 166, 168 and with a ridge 170 on the sleeve received in a corresponding groove 172, all in the manner of the valve of FIGS. 1-5. While this mounting arrangement holds the sleeve ends in place, it is found that under high water pressure, leakage can occur between the sleeve end 160 and the face 162 of the housing part 166, particularly as the sleeve becomes pinched closed and the tube flange 160 tends to pull away from the surface 162. It has been found that leakage can be prevented at high water pressures by providing a compressing rib or ridge 174 near the radially outermost portion of the flange-engaging surface 162. The rib 174, which extends in a ring around the axis 140 of the valve, applies a localized high compressing force which prevents the leakage thereby of water under high pressure, even when the sleeve is fully pinched closed and the sleeve flange 160 tends to draw away from the flange-engaging surface 162. The same arrangement is utilized at the other end of the sleeve, so that a rib 174 is provided on the two flange-engaging surfaces 162 that face each other.

Thus, the invention provides a valve which can operate reliably with low cost and light weight injection molded plastic parts. In addition, the valve is compact and eliminates the need for ungainly extending parts such as valve stems with handles at the end that are found in typical valves. The valve includes a pair of closing members that are slideably mounted and that both move towards the center line of a tube, a sleeve of flexible material that is pinched closed by the closing members. The closing members are moved by a cam that rotates about an axis substantially coincident with the axis of the tube and which has camming surfaces extending in a spiral. The camming surfaces have numerous discontinuities that form lands for holding the valve at many partially closed positions. The sleeve which is pinched closed is formed with flanges at its opposite ends to facilitate sealable mounting of the sleeve. Stressing of the sleeve is minimized by mounting it in a slightly compressed condition, by providing cut-away regions in the housing near the flanges to permit them to flex towards one another when the sleeve is pinched closed, and by forming the closing members with strain-relieving portions. The closing members can be formed with concave nips so that the closing members are slightly closer together at the ends of their nips than at the middle thereof, to more completely close the tube with only moderate closing forces. The spiral cams that move the closing members together can be provided with a spiral or camming angle that decreases as the tube approaches full closure, to minimize the required cam-turning forces. Leakage past the flanges of the sleeve ends can be avoided even at high pressure, by providing narrow ribs in the flange-engaging housing parts to locally compress radially outer portions of the sleeve flanges.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A valve comprising:
 a tube of resilient material:
 a pair of compressing members on opposite sides of the tube; and
 means for moving the compressing members together and directly against said tube to squeeze the tube closed;
 each compressing member having a length in a direction transverse to the axis of the tube, at least as great as the width of the fully squeezed-close tube, and each compressing member being concave near either end thereof, so that as the tube becomes fully squeezed the tube portions at the ends of the squeeze line are supported against outward movement, whereby to more completely close the tube.

2. The valve described in claim 1 wherein:
 each compressing member is concavely rounded at an average radius of curvature on the order of ten times the diameter of the tube.

3. A valve comprising:
 a valve body;
 a tube of resilient material held in said body:
 a pair of compressing members disposed on said valve body on opposite sides of the tube, said compressing members having nip portions extending transverse to the axis of the tube and having a length at least as great as the width of the fully squeezed-closed tube; and
 means for moving the compressing members together and against said tube, to squeeze the tube closed;
 the compressing members being formed so they are closer together at the opposite nip end portions which compress said tube than at the middle of the nips, whereby to more completely close the tube with moderate forces on the compressing members.

4. A valve comprising:
 a housing having an inlet and an outlet and a flexible tube in communication therebetween;
 a pair of closing members on opposite sides of said tube, said members slidably mounted on the housing towards and away from the centerline of the tube to close and open it to the passage of fluid therethrough; and
 means for moving both of said closing members towards one another to close the tube;
 said moving means including a cam member rotatably mounted about the axis of the tube and having a pair of camming surfaces extending along substantially spirals so that they vary in distance from the axis of the tube at different angular positions about the axis, said camming surfaces engaged with the closing members to move them, and said closing members being restrained from rotating with the cam member about the tube axis;
 at least one of said camming surfaces having a plurality of steps along the spiral, to retain the cam in a position wherein the valve is partially open.

5. A valve comprising:
 a tube of resilient material, said tube having a tubular portion and outwardly extending flanges at opposite ends of the tubular portion;
 valve housing means extending around the tube and having first flange-facing portions adjacent to the flange surfaces that face one another, said housing means also including second end surfaces pressing against surfaces of the flanges opposite the first flange-facing portions; and
 tube compressing means moveable against the tubular portion at a location between said flanges to squeeze the tube closed;
 said first flange-facing portions being cut-away at the radially inner regions to leave a large gap around the tube where the tubular portion intersects the flanges, at least at the same sides of the tube which are compressed by the tube compressing means, whereby to permit inner flange portions to draw together when the tube is compressed.

6. A valve comprising:
 a tube of resilient material, having a pair of flanges at its opposite ends;
 a first housing portion disposed about said tube, said first housing portion having a pair of radially extending guide slots on opposite sides of the tube and having a pair of ends for abutting the faces of said tube flanges that face one another, said ends of said first housing portion being of larger diameter than said tube flanges;
 a pair of compressing members slidably mounted in said slots, each member having a nip portion for pressing against the tube so that the tube can be squeezed closed between the nip portions of the two members, and each member having a cam follower portion;

a cam rotatably mounted about the axis of the tube and having a pair of camming portions that vary in distance from the axis of the tube and which engage the compressing members to move them towards the tube when the cam is turned; and a pair of second housing parts, each engaged with a different end of the first housing portion and having a flange-abutting surface that squeezes the flanges against an end of the first housing portion;

said cam having a manually turnable outer surface located between said second housing parts.

7. The valve described in claim 6 wherein:

said camming surfaces including a plurality of discontinuities for retaining the compressing members at a plurality of positions.

8. A valve comprising:

a housing having an inlet and an outlet and a tube of flexible material coupling said inlet and outlet;

a pair of closing members of material stiffer than the material of said tube, said closing members slidably mounted on the housing on opposite sides of the tube to move towards and away from the centerline of the tube to close and open the tube to the passage of fluid therethrough; and means for moving both of said closing members towards one another to close the tube;

each of said closing members having an elongated concavely curved rigid nip portion extending transverse to the axis of the tube, each nip portion having a length greater than the width of the tube when the tube is squeezed substantially closed, and each nip portion positioned to directly contact said tube when said closing members are moved towards the tube.

9. A valve comprising:

a housing having an inlet and an outlet and a tube in communication therebetween;

a pair of closing members on opposite sides of said tube, said members slidably mounted on the housing towards and away from the centerline of the tubular portion to close and open it to the passage of fluid therethrough; and means for moving both of said closing members towards one another to close the tubular portion;

said moving means including a cam member rotatably mounted about the axis of the tube and having a pair of camming surfaces extending along substantially spirals so that they vary in distance from the axis of the tube at different angular positions about the axis, said camming surfaces engaged with the closing members to move them, and said closing members being restrained from rotating with the cam member about the tube axis;

the camming angles of said camming surfaces decreasing at locations of decreasing radial distance from the axis of said tube.

* * * * *